Dec. 5, 1944.  J. W. SESSUMS, JR  2,364,102
AIRCRAFT FLIGHT INDICATOR
Filed Nov. 16, 1943

INVENTOR
JOHN W. SESSUMS
BY
ATTORNEYS

Patented Dec. 5, 1944

2,364,102

UNITED STATES PATENT OFFICE 2,364,102

AIRCRAFT FLIGHT INDICATOR

John W. Sessums, Jr., Washington, D. C.

Application November 16, 1943, Serial No. 510,525

2 Claims. (Cl. 73—178)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to flight indicators for aircraft and more particularly to a novel type of indicator for signifying to the pilot of the craft whether or not his craft is flying along the particular glide path prescribed for a blind landing approach into an airport.

In several of the presently known types of blind landing systems the pilot brings the aircraft into the airport by flying at a predetermined attitude until a marker beacon is reached after which the engine is throttled down and the airplane caused to follow a prescribed glide path until the wheels touch the runway, the motor then being cut off and the airplane brought to a stop. In making this type of approach it is very difficult for the pilot to hold the aircraft on the prescribed glide path inasmuch as the indications of two separate instruments must be continually observed in order to keep the airplane "on course." These two instruments are the air-speed indicator and the rate-of-climb indicator, it being necessary that both the air speed of the craft and the rate of descent thereof be maintained at predetermined values in order to stay on the prescribed glide path.

The principal object of the present invention is to combine an air-speed indicator and a rate-of-climb indicator into a single instrument which will quickly indicate to the pilot whether or not his aircraft is following the proper glide path, and, if not, what steps should be taken to bring the craft back "on course."

A more particular object of this invention is to so arrange the indicating elements of the composite instrument that the pilot can see at a glance whether or not his approach is being made correctly. In order to accomplish this, the elements are so arranged as to indicate in a natural and logical fashion whether or not the air speed and rate of descent are correct, or whether the air speed is too slow or too fast or the rate of descent too steep or too flat.

It is recognized that air-speed and rate-of-climb indicators have previously been combined into a single instrument, such instrument being the one shown in U. S. Patent No. 2,152,635 of Carl J. Crane, et al., issued April 4, 1939. In this device, however, the two indicators were combined for the purpose of indicating whether or not the aircraft was following a normal cruising course rather than whether or not it was following a prescribed glide course. In the present invention, a conventional air-speed indicator and a conventional rate-of-climb indicator cooperate in a novel manner to produce a visual representation of the position of the aircraft with respect to the prescribed glide path.

In the particular embodiment of the invention herein shown and described, I have disclosed a preferred form of apparatus for carrying out my invention, but it is to be understood that the invention is not necessarily limited to the specific type of construction herein disclosed, but instead includes all structures which come within the scope of the claims appended hereto.

Figure 1:
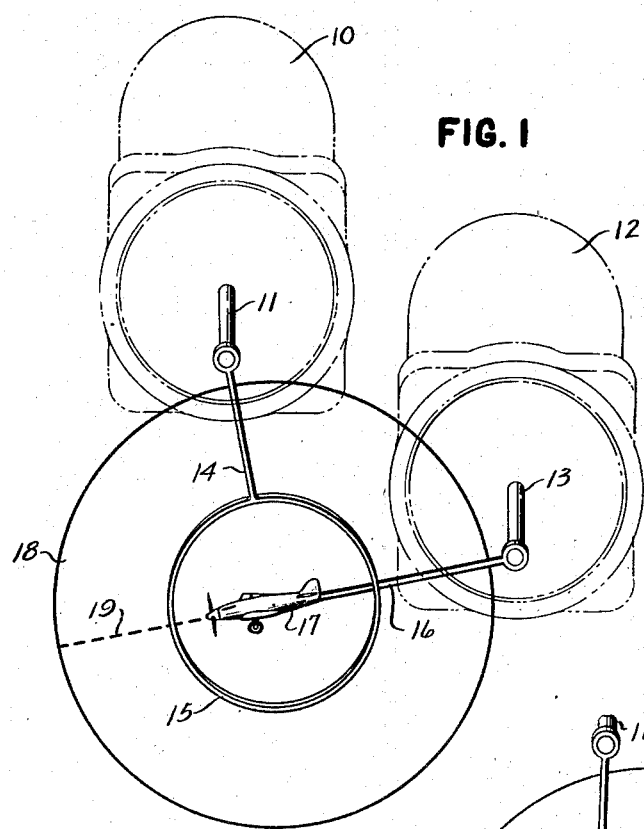
Figure 1 is a perspective view of one form of apparatus which may be used in carrying out my invention. The parts are shown in the positions which they occupy when the aircraft is approaching the airport at the proper speed and at the proper rate of descent.

As shown in Figure 1, reference numeral 10 designates a conventional air-speed indicator having the customary handstaff 11. Suitable provision should be made for reversing the direction of movement of the handstaff so that it will move in a counterclockwise direction with an increase in air speed rather than in a clockwise direction as is customary in conventional air-speed indicators. This may be accomplished either by means of suitable gearing within the instrument or by reversing one of the lever arms therein so as to reverse the movement of the handstaff. A conventional rate-of-climb indicator 12, having the usual handstaff 13, is located below and to one side of the air-speed indicator. The two indicators 10 and 12 may be maintained in the positions which they occupy in Figure 1 by means of a suitable supporting frame or plate (not shown) to which they may be rigidly attached. The conventional hands usually provided on the instruments 10 and 12 are removed and replaced with elements which are more suitable for the purpose of carrying out my invention. For example, to the handstaff 11 of the air-speed indicator is attached a hand 14 which carries at its outer end a light loop or ring 15, while to a handstaff 13 of the rate-of-climb indicator is attached a hand 16 which is provided at its outer end with a small facsimile of an aircraft 17. A dial 18 having suitable indicia 19 inscribed thereon for representing the glide path to be followed by the aircraft may be attached in any suitable manner to the supporting frame on which the instruments 10 and 12 are mounted. The relative positions of the two instruments 10 and 12 are such that the ring 15 will move across the face of the dial 18 in a direction at right angles to the path of movement of the airplane 17 across the dial. Furthermore, the instrument 12 is so positioned that the axis of the handstaff 13 will lie on the glide path 19 extended.

Figure 3:
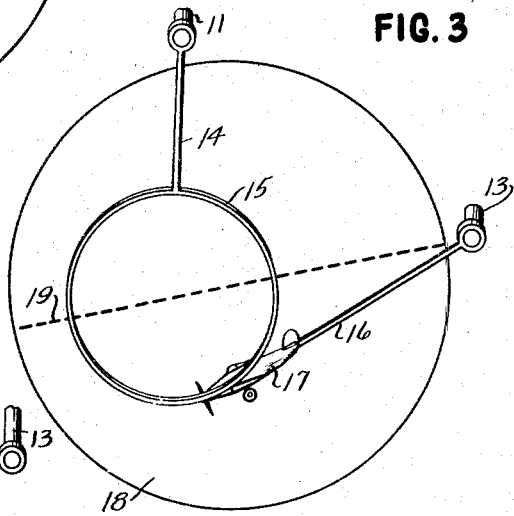
Figure 3 shows the pointers in the position which they assume when the aircraft is flying at too low a rate of speed and at too great a rate of descent.
Figure 2:
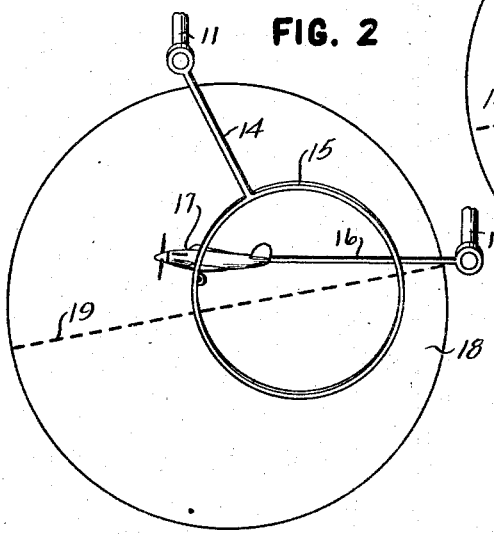
Figure 2 shows the position which the pointers assume when the aircraft is flying at too high speed and at an insufficient rate of descent.

As hereinbefore stated, the ring 15 and the airplane 17 are shown in Figure 1 in the positions which they occupy when the air speed and rate of descent of the aircraft are correct for the particular glide path chosen. The hands 14 and 16 may be made to assume these positions for a given air speed and rate of descent by locating the hands on the handstaffs 11 and 13 in approximately the correct positions to indicate this condition. Minor adjustments in these positions may then be made by means of the usual zero-adjust mechanisms incorporated in the instruments. If the air speed of the aircraft is greater than that selected for the approach into the airport, the ring 15 will move to the right, as shown in Figure 2, so as to indicate that the airplane is traveling too fast. If the airplane is moving at a slower speed than that chosen for the approach, the ring 15 will move to the left as shown in Figure 3 so as to show that the airplane is lagging behind or moving too slow. Similarly, when the aircraft is not descending fast enough to stay on the proper glide path, the airplane 17 will move upwardly as shown in Figure 2, thereby showing that the glide path actually being followed by the aircraft is too flat. If the aircraft is descending too fast, the airplane 17 will move downward as indicated in Figure 3 to show that the aircraft is diving beneath the proper glide path.

Inasmuch as only a small portion of the range of the indicators 10 and 12 will be useful for the present purpose, it will be necessary to adjust the conventional diaphragm limit stops on the instruments so as to prevent the ring 15 and the airplane 17 from moving off the dial 18 when the aircraft is at rest, flying at high speed, performing acrobatic maneuvers, etc.

It will thus be seen that I have combined an air-speed indicator and a rate-of-climb indicator in such a manner as to show at a glance the position which the aircraft bears with respect to a prescribed glide path. The indication given by the improved instrument is such as to quickly show whether or not the aircraft is "on course" and, if not, in what manner the air speed or rate of descent should be corrected to place the aircraft in the proper attitude for a perfect approach. It is to be realized, of course, that the construction herein shown is not the only one possible in carrying out my invention and that variations may be made in the general scheme of the apparatus without departing from the real invention therein.

I claim:

1. An aircraft flight indicator comprising an indicator dial, indicia on said dial representing a prescribed glide path for the aircraft, a substantially circular indicating element adapted for movement along said indicia in accordance with the air speed of the aircraft, said element being arranged to occupy a position midway along said indicia when the aircraft is traveling at a certain desired air speed, and an element in the form of a miniature aircraft adapted for movement in accordance with the rate of descent of the aircraft along a path lying substantially at right angles to said indicia and intersecting the latter at its midpoint, said last-named element being smaller in size than said circular indicating element and arranged to lie directly over said indicia when the rate of descent corresponds to a certain desired value, whereby the miniature aircraft element will lie on the indicia representing the prescribed glide path and in the center of the circular indicating element when the aircraft is traveling along the prescribed glide path at the proper speed.

2. An aircraft glide path indicator comprising a frame, an air-speed indicator secured to said frame, said air-speed indicator having an air-speed pointer, a rate-of-climb indicator secured to said frame, said rate-of-climb indicator having a rate-of-climb pointer, an indicator dial secured to said frame, indicia on said dial representing a prescribed glide path for an aircraft, a substantially circular ring secured to the end of said air-speed pointer and adapted to move along said indicia, said ring being adapted to occupy the position midway along said indicia when the aircraft is traveling at a certain desired air speed, and an element in the form of a miniature aircraft secured to the end of said rate-of-climb pointer, said element being smaller in size than said ring and adapted to move along a path lying substantially at right angles to said indicia and intersecting the latter at its midpoint, said element also being adapted to lie directly over said indicia when the rate of descent of the aircraft corresponds to a certain desired value, whereby the miniature aircraft device will lie on the indicia representing the prescribed glide path and in the center of the ring when the aircraft is gliding at the proper angle and speed.

JOHN W. SESSUMS, Jr.